Jan. 22, 1924.

R. J. MACNAIR

SPRING STRUCTURE

Filed June 3, 1920

1,481,298

Inventor
Robert J. Macnair.
By his Attorney
W. B. Morton

Patented Jan. 22, 1924.

1,481,298

UNITED STATES PATENT OFFICE.

ROBERT J. MACNAIR, OF PROVIDENCE, RHODE ISLAND.

SPRING STRUCTURE.

Application filed June 3, 1920. Serial No. 386,215.

*To all whom it may concern:*

Be it known that I, ROBERT J. MACNAIR, a citizen of the United States, and a resident of Providence, county of Providence, State of Rhode Island, have invented new and useful Improvements in Spring Structures, of which the following is a specification.

This invention relates to spring structures, and has for its principal object to provide a spring structure in which the resiliency of the spring automatically adjusts itself to the load to be carried and in which the rebound from the expansion of the spring when the load is relieved is in a large measure absorbed.

My improved spring structure is particularly adapted for motor vehicles, but may be used with equal advantage on railway cars and other vehicles, or wherever cushioning springs are employed.

My invention consists particularly of an improvement upon the spring structure shown in the patent to one J. B. Sweeney, No. 1,125,891, granted January 19, 1915, the object of the improvement being to simplify the construction of the Sweeney spring structure to lessen its manufacturing cost and to make it more practical, both for original installation in new cars and application to cars already built in lieu of the elliptical spring now universally employed.

My improvements also include the provision of a novel form of spring, particularly adapted for the rough usage to which automobile springs are subjected, the design being such that over-compression of the spring is impossible.

My improved spring also has the advantage that it can be taken off and replaced without taking the car down, and without special tools, and also that the stiffness of the spring may be increased or lessened by the addition to or removal of the individual leaves of the spring without affecting the operation of the other leaves of the spring.

With the above objects in view, my invention consists particularly of the construction shown in the accompanying drawings, wherein—

Figure 1:
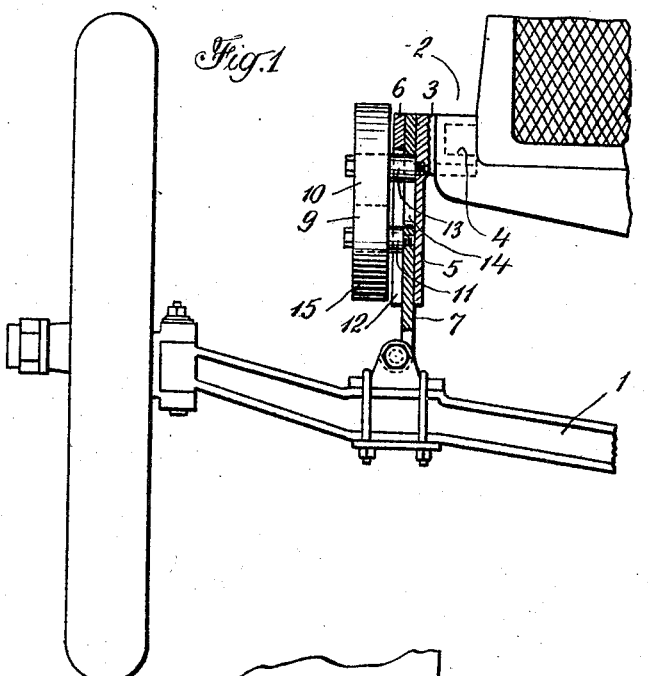
Figure 1 is a front view of an automobile equipped with my improved spring structure, a portion of the spring structure being shown in section.
Figure 3:
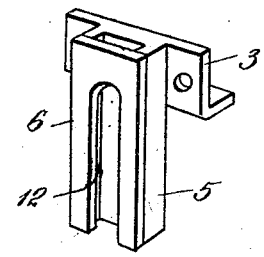
Figs. 3 and 4 are detail views of two parts of the spring structure which will be later described.
Figure 4:
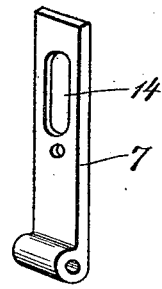
Figure 2:
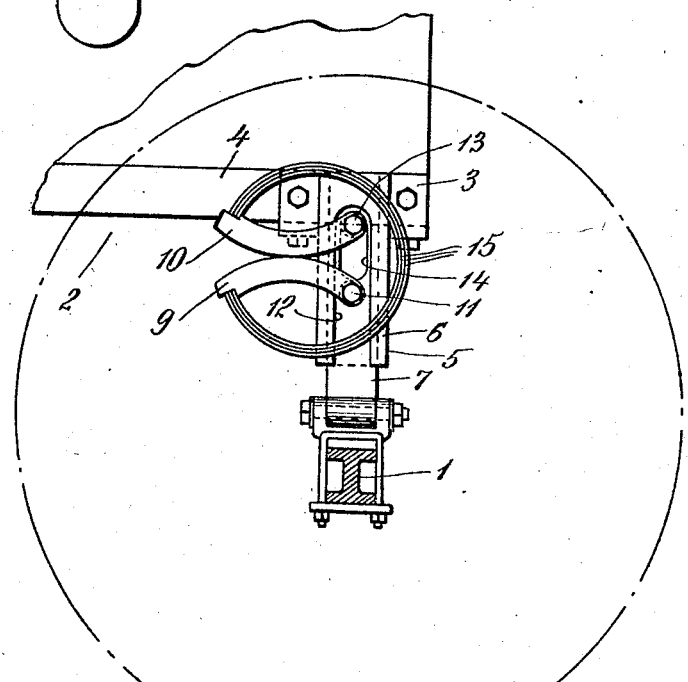
Fig. 2 is a side view of the spring structure shown in Fig. 1 looking from the left of that figure.

Referring to the drawings, 1 indicates the axle of the vehicle upon which the frame 2 is supported on my improved spring structure of which four units, one at each corner of the frame, are preferably employed.

My improved spring structure comprises a bracket 3 adapted to be attached to the frame of the vehicle at the point where it is to be supported on the spring in any suitable manner. As shown, the bracket consists of a short piece of angular cross section forming a step in which the channel side bar 4 of the vehicle frame rests in the manner shown in dotted lines in Fig. 1, the bar being attached to the step by bolts passing through the holes in the vertical portion of the bracket and through the web of the channel bar. Attached to the bracket is a guide comprising a channel 5 with a cover plate 6 adapted to enclose a tongue 7 hinged to the axle of the machine at the point of the usual spring connection.

The tongue 7 fits loosely in the guide for free vertical movement but holds the frame and axle against undue torsional or lateral displacement. The frame 4 is supported on the tongues 7 by means of a pair of rocking levers 9 and 10. The lever 9 is fulcrumed on the tongue 7 by a stud 11 set in the tongue and projecting through a slot 12 in the cover plate 6 of the guide, while the lever 10 is fulcrumed on a stud 13 set in the back plate of the guide 5 and projecting through a slot 14 in the tongue, the slot 14 being somewhat greater in length than the relative movement of the frame and axle as permitted by the springs under normal road conditions.

The levers 9 and 10 have their contacting faces curved and machined off to true bearing surfaces so as to work one on the other with a rolling contact as the body and frame move relatively to each other in the use of the vehicle.

The free ends of the levers 9 and 10 are pressed toward each other by suitable springs, here shown as consisting of a plurality of split rings 15 of spring steel fitting one in the other, and with their divided ends snapped into steps provided in the free ends of the two levers 9 and 10 whereby the springs tend to draw the free ends of the levers together, separating the fulcrumed ends of the levers, while the weight of the vehicle tends to press the fulcrumed ends of the levers together and separate their free ends.

The point of rolling contact between the two levers forms a shifting fulcrum for both levers, that is, considering the pivoted ends of the levers as the point of attachment of the work and the free ends of the levers as the point of application of the power. When the vehicle is but lightly loaded, the springs will draw the free ends of the levers close together, establishing a fulcrum between the levers at a point near their outer ends, and nearer the point of application of the power than the point of attachment of the work. In this position a considerable relative movement of the frame and axle toward each other is required to effect an appreciable separation of the ends of the spring but as the movement of the body toward the axle is continuous, the point of contact, which is the fulcrum of both levers, will shift toward their pivoted ends, shortening the work arm of the levers and lengthening the power arm, thus increasing the leverage of the spring so that the same strength of spring will balance a greater load. This increasing of the leverage of the spring is progressive, hence, whatever the shock encountered the spring will automatically adjust itself to counterbalance it, gradually absorbing the shock as the levers turn on each other and without coming to an abrupt stop unless the shock is so excessive as to take up the entire relative movement of the parts permitted by the slot 14, and the slot is of a length to allow a relative movement considerably greater than necessary under normal road conditions.

The spring of split rings is particularly advantageous for several reasons. In the first place, the springs allow a large relative movement between the parts in proportion to the size of the springs and where the springs are arranged to encircle the levers in the manner shown the bulk is much reduced, the whole structure taking up less room than the usual elliptical spring. Also, these rings are readily assembled and removed and any one ring may be replaced when broken without removing any part of the spring structure and without special tools. Also the same levers, guides, etc., may be used to provide springs of different strengths by merely varying the number of split rings assembled in the spring.

The spring structure of the design shown in the drawings has been found entirely satisfactory in practical use and it is the preferred embodiment of my invention so far as now known. It is to be understood, however, that the several parts of the structure may be variously modified without departing from the scope of the invention.

I claim:

1. In a spring structure, the combination of a pair of rocking levers supporting the members whose movement is to be cushioned with their contacting faces forming a shifting fulcrum and a spring for such levers comprising a spring encircling the levers with its opposite ends bearing against the free ends of the levers and tending to press them together.

2. In a spring structure, the combination of a pair of rocking levers supporting the members whose relative movement is to be cushioned with the contact faces of the levers forming a shifting fulcrum therefor and a spring for such levers comprising a plurality of split rings of spring material nested one in the other and encircling said levers with the ends of the spring engaging the free ends of the levers and tending to press them together.

3. In a spring structure, the combination with the two members whose movement is to be cushioned, of guides comprising telescoping parts arranged to permit free relative movement of the members toward and from each other and to prevent relative lateral movement, connections between said members comprising a pair of rocking levers fulcrumed one on each of the telescoping parts of said guide, respectively, with their curved faces in contact, and resilient means tending to draw the free ends of said levers together.

4. In a spring structure, the combination with the two members whose movement is to be cushioned, of guides comprising telescoping parts arranged to permit free relative movement of the members toward and from each other and to prevent relative lateral movement, connections between said members comprising a pair of rocking levers fulcrumed one on each of the telescoping parts of said guide, respectively, with their curved faces in contact, and a spring consisting of a split ring having its ends engaging the free ends of said levers and tending to draw them together.

5. In a spring structure, the combination with the two members whose relative movement is to be cushioned, of a pair of units connecting said members at different points, said units each comprising telescoping connections between said members for permitting their free relative movement but preventing lateral movement in any direction, springs interposed between said members for resisting their movement toward each other, and a pivotal connection between one telescoping guide member of each pair and the member on which it is connected.

6. In a spring structure, the combination with the two members whose relative movement is to be cushioned, of a pair of units connecting said members at different points, said units each comprising telescoping connections between said members for permitting their free relative movement but preventing lateral movement in any direction, a pivotal connection between one telescoping guide member of each pair and the member on which it is connected, a pair of rocking levers pivoted on the telescoping parts, respectively, with their curved faces in contact, and resilient means for resisting separation of the free ends of the levers.

Signed at Providence, in the county of Providence, and State of Rhode Island, this second day of January, 1920.

ROBERT J. MACNAIR.